United States Patent
Kraemer et al.

(10) Patent No.: US 10,276,177 B2
(45) Date of Patent: Apr. 30, 2019

(54) TECHNOLOGIES FOR PRIVATELY PROCESSING VOICE DATA USING A REPOSITIONED REORDERED FRAGMENTATION OF THE VOICE DATA

(71) Applicant: Intel Corporation, Santa Clara, CA (US)

(72) Inventors: Sefi Kraemer, Ein Carmel (IL); Ofer Gueta, Ganei-Tikva (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/283,330

(22) Filed: Oct. 1, 2016

(65) Prior Publication Data

US 2018/0096695 A1    Apr. 5, 2018

(51) Int. Cl.
  *G10L 21/00*  (2013.01)
  *G10L 21/06*  (2013.01)
  *G06F 3/0482*  (2013.01)

(52) U.S. Cl.
  CPC .............. *G10L 21/00* (2013.01); *G10L 21/06* (2013.01); *G06F 3/0482* (2013.01)

(58) Field of Classification Search
  CPC ........ G10L 21/00; G10L 21/06; G06F 3/0482
  USPC .................. 704/273, 201; 715/717
  See application file for complete search history.

(56) References Cited

U.S. PATENT DOCUMENTS

| | | | |
|---|---|---|---|
| 4,905,278 A | 2/1990 | Parker | |
| 2005/0198570 A1 | 9/2005 | Otsuka et al. | |
| 2006/0247919 A1* | 11/2006 | Specht | G10L 21/06 704/201 |
| 2006/0247924 A1 | 11/2006 | Hillis et al. | |
| 2007/0203698 A1* | 8/2007 | Mapes-Riordan | G10L 21/06 704/231 |
| 2014/0229831 A1* | 8/2014 | Chordia | G06F 3/0482 715/717 |
| 2015/0095035 A1 | 4/2015 | Shechtman | |

OTHER PUBLICATIONS

International search report for PCT application No. PCT/US2017/047775, dated Nov. 29, 2017 (3 pages).
Written Opinion for PCT application No. PCT/US2017/047775, dated Nov. 29, 2017 (9 pages).

* cited by examiner

*Primary Examiner* — Farzad Kazeminezhad
(74) *Attorney, Agent, or Firm* — Barnes & Thornburg LLP

(57) ABSTRACT

Technologies for privately processing voice data include a compute device configured to continually or periodically capture voice data of a user by the compute device. The captured voice data is processed to remove or reduce the user's privacy-sensitive information. For example, the compute device fragments the captured voice data to generate a set of voice data fragments and further scrambles the voice data fragments to generate scrambled voice data fragments having a sequential order different from the plurality of voice data fragments. To scramble the voice data fragments, the compute device may reorder the voice data fragments such that each fragment is repositioned from its corresponding original sequential position in the voice data by a particular number of words, syllables, or phrases.

22 Claims, 6 Drawing Sheets

TECHNOLOGIES FOR PRIVATELY PROCESSING VOICE DATA USING A REPOSITIONED REORDERED FRAGMENTATION OF THE VOICE DATA

BACKGROUND

Voice processing is used in many systems to provide voice-command or voice-related services to a user. To do so, typical voice processing systems generate voice profiles of users from a large set of voice samples of that user. The large set of voice samples may be captured using the user's device or otherwise supplied to the voice processing system. The voice samples are often captured and analyzed over long periods of time in order to train the voice processing system.

Voice samples of a user may be locally or remotely processed. For example, in some voice processing systems, voice samples collected from a user are processed on the user's devices and subsequently transmitted to a system outside of the user's devices, for example, a cloud-based system. Alternatively, the raw, collected voice samples may be transmitted to a system outside of the user's device for processing. Either way, user's privacy-sensitive information embedded in, associated with, or otherwise determinable from the voice samples is at risk once the voice samples leave the user's devices. As such, the user's privacy-sensitive information may be compromised and made public via analysis of the voice samples.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
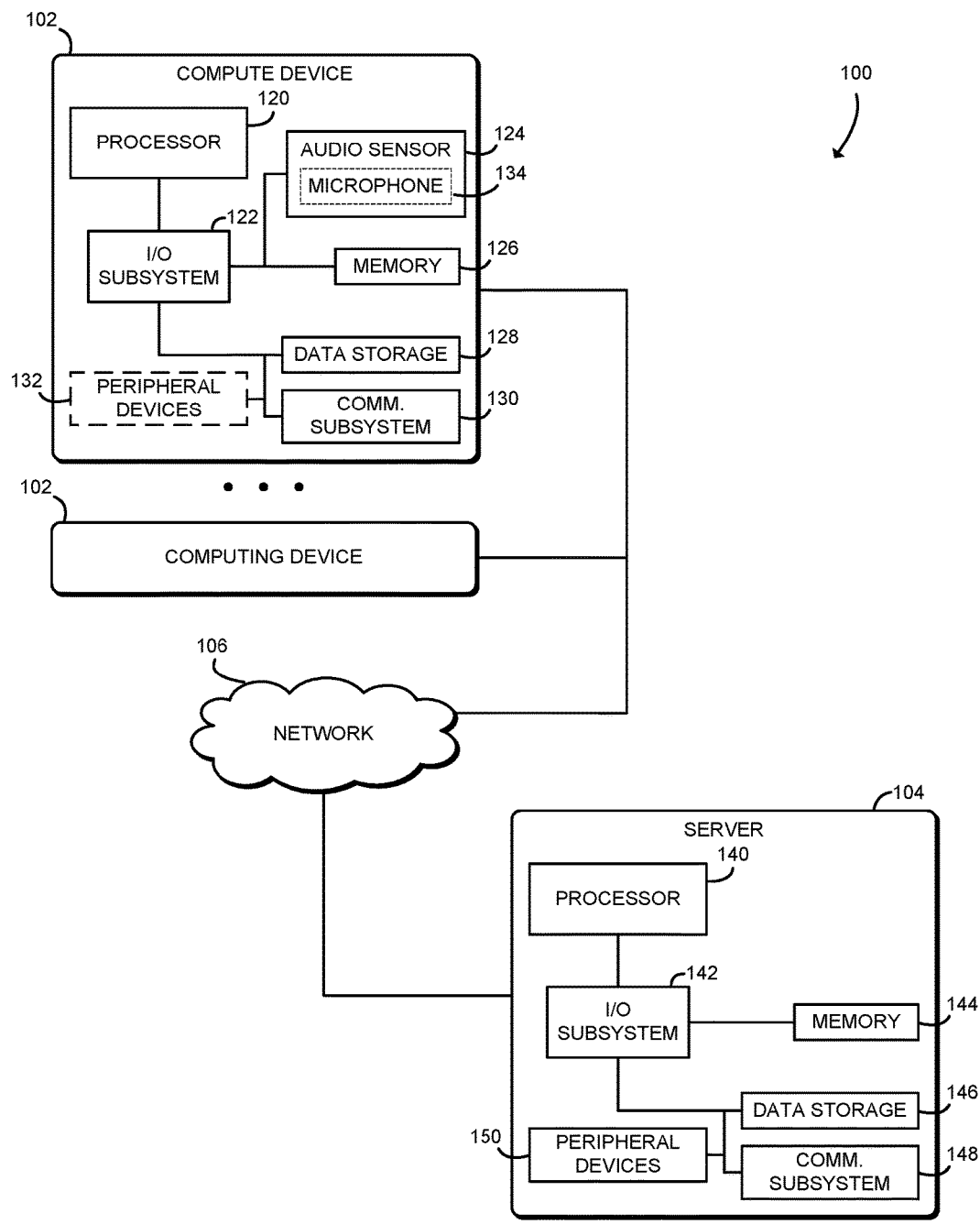
FIG. 1 is a simplified block diagram of at least one embodiment of a system for privately processing user's voice data.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for privately processing voice data of a user includes a compute device 102, which may be configured to communicate with a server 104 over a network 106. In use, the compute device 102 is configured capture voice data of a user and process the captured voice data to generate processed voice data without compromising privacy-sensitive information embedded in the user's voice data. It should be appreciated that, in some embodiments, the compute device 102 may continually capture the voice data of the user without specific direction from the user. To generate the processed voice data as discussed in more detail below, the compute device 102 fragments the captured voice data into a set of voice data fragments. Subsequently, the compute device 102 scrambles the voice data fragments (e.g., by reordering the voice data fragments). The processed voice data, in the form of scrambled voice data fragments, is then transmitted to the server 104, and the server 104 is configured to analyze the processed voice data in order to perform one or more services based on the processed voice data of the user. By transmitting the processed voice data of the user as scrambled voice data fragments, the system 100 is able to process and analyze the voice data of the user without exposing the privacy-sensitive information. In some embodiments, the compute device 102 may determine metadata associated with each voice data fragment and append metadata to the corresponding voice data fragment prior to scrambling the voice data fragments. It should be appreciated that the metadata is designed to minimize risk of exposing the user's privacy-sensitive information while providing some additional information of the voice data fragment for future analysis of the processed voice data by the server 104.

The compute device 102 may be embodied as any type of computer or compute device capable of performing the functions described herein. For example, the compute device 102 may be embodied as a smartphone, a tablet computer, a laptop computer, a notebook, desktop computer, a netbook, an Ultrabook™, a smart device, a personal digital assistant, a mobile Internet device, and/or other compute device. As shown in FIG. 1, the illustrative compute device 102 includes a processor 120, an input/output ("I/O") subsystem 122, an audio sensor 124, a memory 126, a data storage 128, a communication subsystem 130, and one or more peripheral devices 132 in some embodiments. Of course, the compute device 102 may include other or additional components, such as those commonly found in a typical computing device (e.g., various input/output devices and/or other components), in other embodiments. Additionally, in some embodiments, one or more of the illustrative components may be incorporated in, or otherwise form a portion of, another component. For example, the memory 126, or portions thereof, may be incorporated in the processor 120 in some embodiments.

The processor 120 may be embodied as any type of processor capable of performing the functions described herein. For example, the processor 120 may be embodied as a single or multi-core processor(s), digital signal processor, microcontroller, or other processor or processing/controlling circuit. Similarly, the memory 126 may be embodied as any type of volatile or non-volatile memory or data storage capable of performing the functions described herein. In operation, the memory 126 may store various data and software used during operation of the compute device 102 such as operating systems, applications, programs, libraries, and drivers. The memory 126 is communicatively coupled to the processor 120 via the I/O subsystem 122, which may be embodied as circuitry and/or components to facilitate input/output operations with the processor 120, the memory 126, and other components of the compute device 102. For example, the I/O subsystem 122 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processor 120, the memory 126, and other components of the compute device 102, on a single integrated circuit chip.

The audio sensor 124 may be embodied as any type of audio capture device capable of capturing audio local to the compute device 102. In the illustrative embodiment, for example, the audio sensor 124 may include, or otherwise be embodied as, a microphone 134. The microphone 134 is configured to capture the user's voice. In the illustrative embodiment, as discussed in more detail below, the microphone 134 is configured to continually or periodically capture the user's voice. For example, after initial authorization by the user, the compute device 102 may capture the user's voice data without further direction from the user in a continual or continuous manner. It should be appreciated that, in some embodiments, the user may configure the compute device 102 to periodically require user's permission.

The data storage 128 may be embodied as any type of device or devices configured for short-term or long-term storage of data such as, for example, memory devices and circuits, memory cards, hard disk drives, solid-state drives, or other data storage devices. In the illustrative embodiment, the compute device 102 may be configured to store voice data indicative of the user's voice, which was captured by the audio sensor 124, in the data storage 128. As discussed in more detail below, the compute device 102 processes the user's voice data when the amount of user's voice data saved in the data storage 128 satisfies a reference size.

The communication subsystem 130 may be embodied as any type of communication circuit, device, or collection thereof, capable of enabling communications between the compute device 102 and other devices (e.g., other compute devices 102 or the server 104 discussed below). To do so, the communication subsystem 130 may be configured to use any one or more communication technologies (e.g., wireless or wired communications) and associated protocols (e.g., Ethernet, Bluetooth®, Wi-Fi®, WiMAX, LTE, 5G, etc.) to effect such communication.

The peripheral devices 132 may include any number of additional peripheral or interface devices, such as other input/output devices, storage devices, and so forth. The particular devices included in the peripheral devices 132 may depend on, for example, the type and/or configuration of the compute device 102 and/or the server 104.

The compute device 102 is configured to communicate with the server 104 via the network 106 to transmit the processed voice data of the user (i.e., the scrambled voice data fragments) as discussed in more detail below. The server 104 analyzes the user's processed voice data and provides various voice-related services based on such analysis. Of course, in some embodiments, some of the procedures discussed below as being executed by the compute device 102 may be instead performed by the server 104. For example, the server 104 may receive the user's voice data captured by the compute device 102 and process the voice data into processed voice data (i.e., the scrambled voice data fragments).

The server 104 may be embodied as any type of computation or computer device capable of performing the functions described herein including, without limitation, a computer, a multiprocessor system, a rack-mounted server, a blade server, a laptop computer, a notebook computer, a tablet computer, a wearable computing device, a network appliance, a web appliance, a distributed computing system, a processor-based system, and/or a consumer electronic device. As shown in FIG. 1, the illustrative server 104 includes a processor 140, an I/O subsystem 142, a memory 144, a data storage 146, communication subsystem 148, and/or other peripheral devices 150. The description of such components of the server 104 is similar to the corresponding components of the compute device 102 and it not repeated herein for clarity of the description. It should be appreciated that the server 104 may be embodied as a single compute device or a collection of distributed compute devices.

The network 106 may be embodied as any type of network capable of facilitating communications between the compute device 102 and the server 104. For example, the network 106 may be embodied as, or otherwise include, a wireless local area network (LAN), a wireless wide area network (WAN), a cellular network, and/or a publicly-accessible, global network such as the Internet. As such, the network 106 may include any number of additional devices, such as additional computers, routers, and switches, to facilitate communications thereacross.

Figure 2:
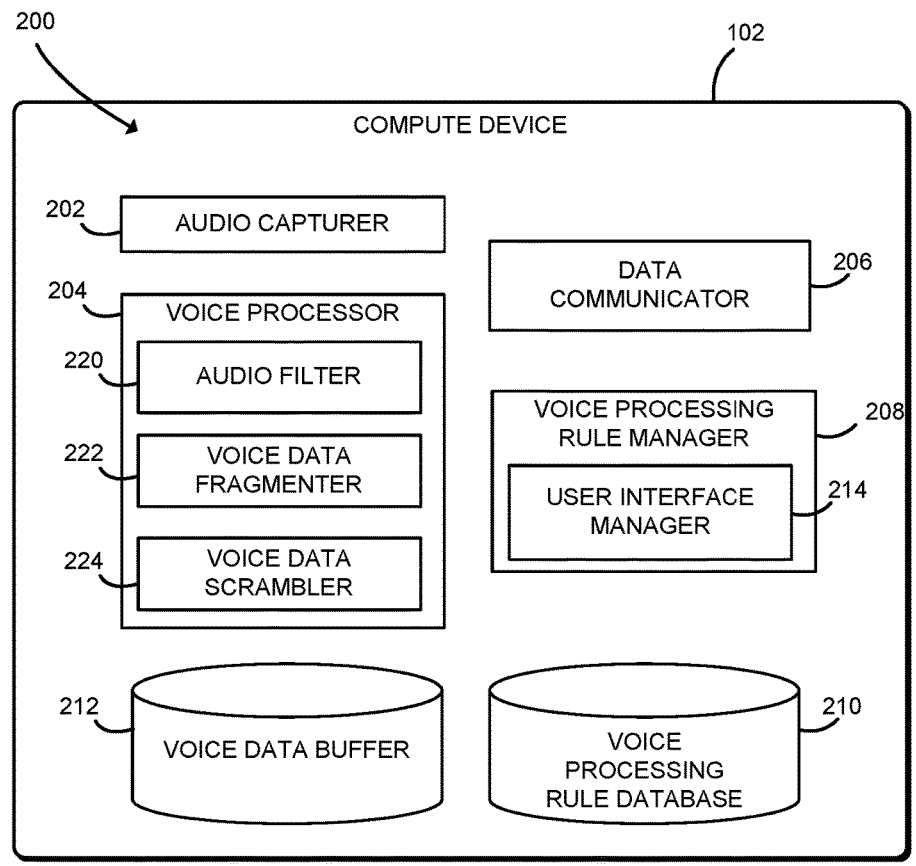
FIG. 2 is a simplified block diagram of at least one embodiment of an environment that may be established by a compute device of the system FIG. 1.

Referring now to FIG. 2, in use, the compute device 102 establishes an environment 200 for privately processing voice data of a user. The illustrative environment 200 includes an audio capturer 202, a voice processor 204, a data communicator 206, and a voice processing rule manager 208. The various components of the environment 200 may be embodied as hardware, firmware, software, or a combination thereof. As such, in some embodiments, one or more of the components of the environment 200 may be embodied as circuitry or collection of electrical devices (e.g., an audio capturer circuit 202, a voice processor circuit 204, a data communicator circuit 206, a voice processing rule manager circuit 208, etc.). It should be appreciated that, in such embodiments, one or more of the audio capturer circuit 202, the voice processor circuit 204, the data communicator circuit 206, and/or the voice processing rule manager circuit 208 may form a portion of one or more of the processor 120, the I/O subsystem 122, the communication subsystem 130, and/or other components of the compute device 102. Additionally, in some embodiments, one or more of the illustrative components of the environment 200 may form a portion of another component and/or one or more of the illustrative components may be independent of one another. Further, in some embodiments, one or more of the components of the environment 200 may be embodied as virtualized hardware components or emulated architecture, which may be established and maintained by the processor 120 or other components of the compute device 102.

The audio capturer 202 is configured to capture the user's voice as the user speaks in the vicinity of the compute device 102 and store a representation of the captured user's voice as captured voice data. In the illustrative embodiment, the audio capturer 202 utilizes the audio sensor 124 to continually or periodically capture the user's voice, which will be processed and analyzed based on one or more voice processing rules stored in a voice processing rule database 210 as discussed in more detail below. In some embodiments, the compute device 102 may require an initial authorization of the user prior to initiating the capturing the user's voice. In such embodiments, the audio capturer 202 may capture the user's voice without further direction from the user in a continual or continuous manner. It should be appreciated that, in some embodiments, the user may configure the compute device 102 to periodically require user's permission. In the illustrative embodiments, the captured voice data produced by the audio capturer 202 is stored in a voice data buffer 212, which may be embodied as a portion of memory or other data storage (e.g., a portion of the memory 126 or data storage 128).

The voice processor 204 is configured to process the captured voice data of the user based on the voice processing rules 210 in order to remove or reduce the user's privacy-sensitive information associated with or embedded in the captured voice data. The voice processing rules 210 may be embodied as, or otherwise include, one or more processing parameters stored in the voice processing rule database 210 as discussed in more detail below. For example, in some embodiments, the processing parameters may include a buffer parameter that indicates a reference buffer fill size. In response to the present size of the voice data buffer 212 (i.e., the amount of voice data presently stored in the voice data buffer 212) satisfying the buffer parameter stored, the voice processor 204 is configured to initiate the processing of the captured voice data stored in the voice data buffer 212 in order to remove or reduce the user's privacy-sensitive information. In this way, the voice processor 204 may be configured to process voice data only after a reference amount of voice data has been captured and stored in the voice data buffer 212.

To facilitate the processing of the captured voice data, the illustrative voice processor 204 contains an audio filter 220, a voice data fragmenter 222, and a voice data scrambler 224. The audio filter 220 is configured to filter the captured voice data of the user. For example, in some embodiments, the audio filter 220 may remove background noise from the captured voice data of the user. The filtered background data (e.g., noise data) may be saved as metadata, which may be used by the server 104 to process or analyze the processed voice data (i.e., the scrambled voice data fragments as discussed below).

The voice data fragmenter 222 is configured to fragment the filtered voice data of the user into a set of voice data fragments based on a fragment parameter, which may be stored as another one of the voice processing rules in the voice processing rule database 210. In the illustrative embodiment, the fragment parameter indicates a size of each fragment (e.g., how large of fragments into which the voice data is to be segmented). For example, the fragment parameter may indicate that each fragment is to have a size equal to a defined number of word(s), syllable(s), or phrase(s).

The voice data scrambler 224 is configured scramble each of the voice data fragments. That is, the voice data scrambler 224 reorders the voice data fragments produced by the voice data fragmenter 222 such that the scrambled voice data has a sequential order different from the set of unscrambled voice data fragments. It should be appreciated that by scrambling the voice data fragments, user privacy-sensitive information associated with the voice data may be removed from, or otherwise reduced relative to, the raw, captured voice data because the user's captured voice is fragmented and scrambled. As such, the scrambled voice data fragments may be processed to train a voice recognition or other voice-dependent service while providing an amount of anonymity to the context of the captured voice (e.g., without providing a coherent captured conversation of the user).

In some embodiments, the voice data scrambler 224 may reorder the voice data fragments by a reference amount. For example, the voice data scrambler 224 may be configured to reorder the voice data fragments to ensure each fragment is repositioned from its original sequential position in the voice data by a particular number of words, syllables, or phrases. In such embodiments, the voice data scrambler 224 may scramble the voice data fragments based on a scramble parameter that identifies such a particular number of words, syllables, or phrases. Alternatively, the scramble parameter may be embodied as a particular algorithm used to reorder the set of voice data fragments. Regardless, the scramble parameter may be stored as another one of the voice processing rules in the voice processing rule database 210. Of course, in other embodiments, the voice data scrambler 224 may randomly reorder the voice data fragments.

The data communicator 206 is configured to facilitate communications between the compute device 102 and the server 104. In the illustrative embodiment in which the compute device 102 is configured to locally process the captured voice data, the data communicator 206 is configured to transmit the processed voice data (i.e., the scrambled voice data fragments) to the server 104. In other embodiments in which the server 104 is configured to process the captured voice data to remove or reduce the user's privacy-sensitive information, the data communicator 206 is configured to transmit the raw, captured voice data to the server 104.

The voice processing rule manager 208 is configured to manage the voice processing rules stored in the voice processing rule database 210. To do so, the voice processing rule manager 208 includes a user interface manager 214, which may provide a user interface to a user to allow the user to define one or more of the voice processing rules (e.g., the buffer parameter(s), the fragment parameter(s), the scramble parameter(s), etc.) either locally or remotely.

Figure 3:
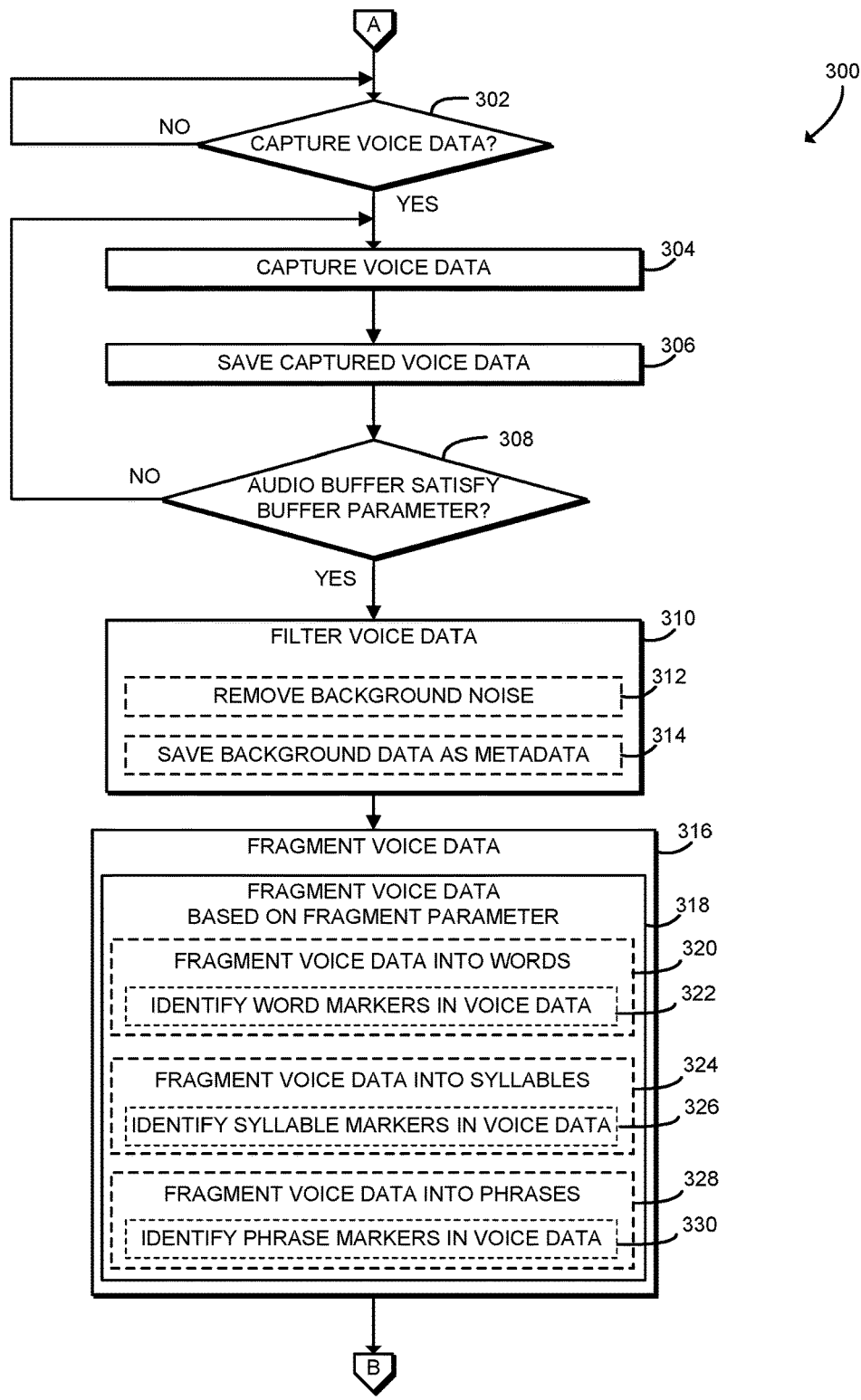
FIGS. 3-4 is a simplified flow diagram of at least one embodiment of a method for privately processing user's voice data that may be executed by the compute device of FIGS. 1 and 2.
Figure 4:
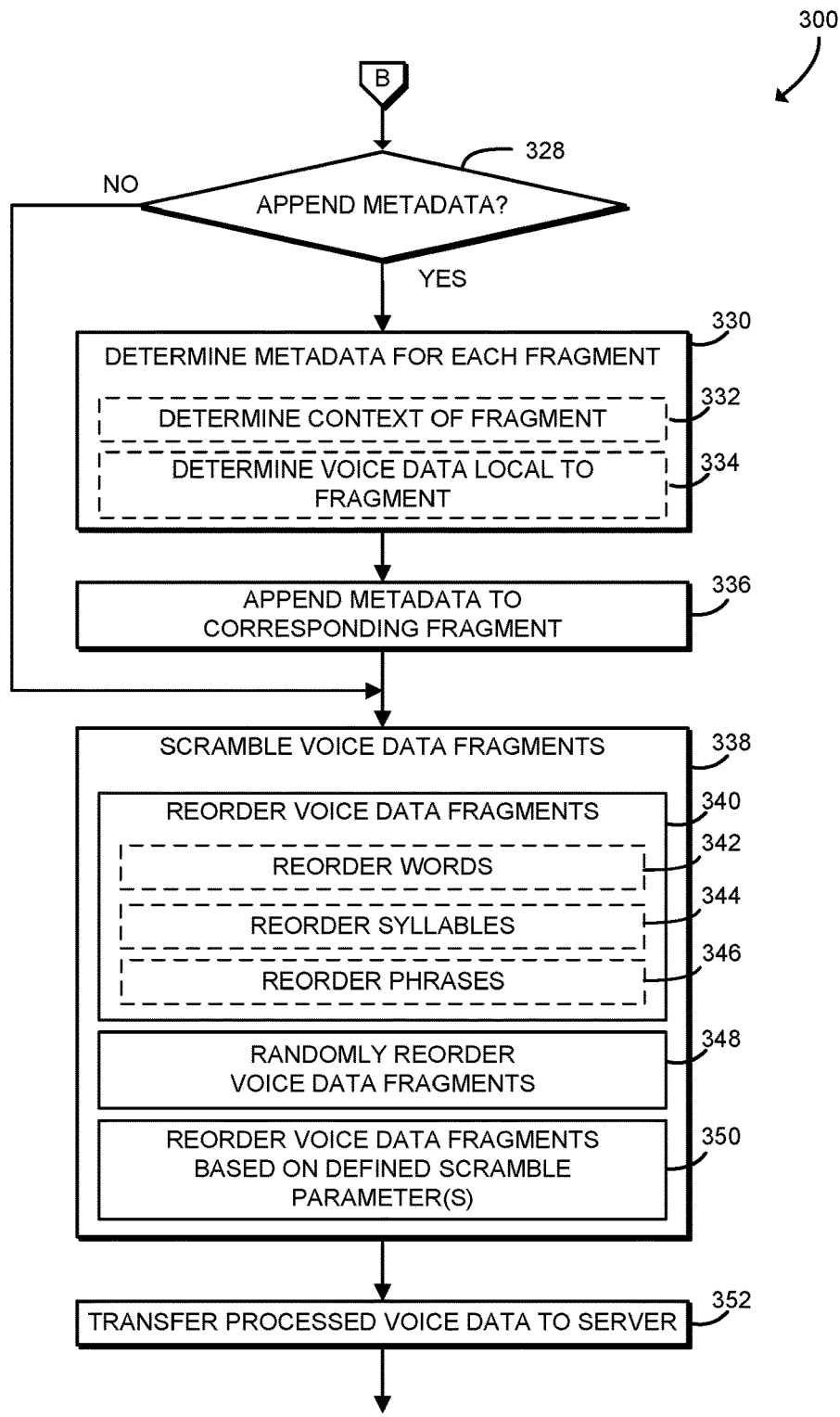

Referring now to FIGS. 3 and 4, in use, the compute device 102 may execute a method 300 for processing captured voice data of a user. The method 300 begins with block 302 in which the compute device 102 determines whether to capture the voice of the user. To do so, in some embodiments, the user may provide an initial authorization to the compute device 102 that gives permission to continually or periodically capture the voice of the user. For example, the user may select an appropriate hardware or software button or widget to indicate a permission to capture the voice data of the user. After initial authorization by the user, the compute device 102 may capture the user's voice data without further direction from the user in a continual or continuous manner. It should be appreciated that, in some embodiments, the user may configure the compute device 102 to periodically require user's permission. Alternatively, in some embodiments, the compute device 102 may be configured to continually, continuously, or periodically capture the voice of the user without the user's authorization and/or express permission.

If the compute device 102 determines to capture voice data of the user, the method 300 advances to block 304, in which the compute device 102 captures the voice data of the user (i.e., the compute device 102 generates or produces voice data indicative or representative of the user's captured voice). For example, in some embodiments, the compute device 102 may use the microphone 134 or other audio sensor 124 to capture the voice of the user, along with any background noise in some embodiments. In block 306, the compute device 102 saves the captured voice data of the user in the voice data buffer 212, which may form a portion of the memory 126 or data storage 128 as discussed above.

In block 308, the compute device 102 determines whether a size of the captured voice data saved in the voice data buffer 212 satisfies the buffer parameter defined by the voice processing rules as discussed above. For example, as discussed above, the buffer parameter may indicate the reference voice data buffer fill size. If, in block 308, the compute device 102 determines that the size of the captured voice data saved in the voice data buffer 212 satisfies the buffer parameter, the method 300 advances to block 310. In block 310, the compute device 102 begins to process the captured voice data of the user to remove or reduce any user privacy-sensitive information that may be associated with the captured voice data or otherwise determinable therefrom. In particular, in block 310, the compute device 102 filters the raw, captured voice data of the user to produce filtered voice data. For example, in block 312, the compute device 102 may remove background noise. Additionally, in some embodiments in block 314, the compute device 102 may save the background data as metadata, which may be used by the server 104 to improve the voice processing training or service as discussed in more detail below. After the compute device 102 has filtered the captured voice data of the user into the filtered voice data in block 310, the method 300 advances to block 316.

In block 316, the compute device 102 fragments the filtered voice data. To do so, in block 318, the filtered voice data is fragmented based on the fragment parameter defined by the voice processing rules as discussed above. For example, in some embodiments, the fragment parameter may indicate a reference length of words. In such embodiments, in block 320, the compute device 102 may fragment the voice data into the reference length of words indicated by the fragment parameter (e.g., fragmenting the captured voice data into single or multiple words). To do so, the compute device 102 may identify the word fragments defined by the fragment parameter based on one or more word markers or identifiers, which may also be defined in the voice processing rule database 210. The word markers may be embodied as any type of data or indicator usable by the compute device 102 to identify one or more fragmenting site(s) of the captured voice data (e.g., pauses between words).

In other embodiments, the fragment parameter may indicate a reference length of syllables. In such embodiments, in block 324, the compute device 102 may fragment the voice data into the reference length of syllables indicated by the fragment parameter (e.g., fragmenting the captured voice data into single or multiple syllable components). To do so, the compute device 102 may identify the syllable fragments defined by the fragment parameter based on one or more syllable markers or identifiers, which may also be defined in the voice processing rule database 210. The syllable markers may be embodied as any type of data or indicator usable by the compute device 102 to identify one or more fragmenting site(s) of the captured voice data (e.g., inflection or accentuation of words).

In yet other embodiments, the fragment parameter may indicate a reference length of phrases. In such embodiments, in block 328, the compute device 102 may fragment the voice data into the reference length of phrases indicated by the fragment parameter (e.g., fragmenting the captured voice data into a grouping or set of words). To do so, the compute device 102 may identify the phrase fragments defined by the fragment parameter based on one or more phrase markers or identifiers, which may also be defined in the voice processing rule database 210. The phrase markers may be embodied as any type of data or indicator usable by the compute device 102 to identify one or more fragmenting site(s) of the captured voice data (e.g., specific words, pauses, etc.).

Regardless, after the compute device 102 has fragmented the captured voice data into the set of voice data fragments in block 318, the method 300 advances to block 328 of FIG. 4. In block 328, the compute device 102 determines whether to append metadata associated with the voice data to one or more of the voice data fragments. If the compute device 102 determines not to append the metadata to one or more voice data fragments, the method 300 branches ahead to block 338, described below. If, however, the compute device 102 determines that appending metadata is desired, the method 300 advances to block 330.

In block 330, the compute device 102 determines the metadata to be appended to the one or more voice data fragments. The metadata may be embodied as any type of data that may be useful by the server 104 in the training of or utilization of voice-related or dependent services based on the voice data. It should be appreciated that by removing or reducing the user privacy-sensitive information related to the voice data using the technologies disclosed herein, the usability of the voice data for training of voice services may likewise be reduced. As such, the metadata may be used to provide "hints" to the server 104 when processing the voice data for voice-related services. For example, the metadata may include the detected words, syllables, and/or phrases occurring immediately before and after the particular voice data fragment, the date and time in which the voice data fragment was captured, and/or other data useful to the server 104 in processing the voice data for voice-related services. Of course, it should be appreciated that the inclusion of metadata may increase the risk of disclosure of privacy-sensitive information related to the voice data. As such, the amount of metadata included with the voice data fragments may vary between embodiments and the level of privacy desired.

In the illustrative embodiment, in block 332, the compute device 102 may determine context information associated with the corresponding voice data fragment (e.g., the time at which the voice data fragment was captured). Additionally or alternatively, in block 334, the compute device 102 may determine voice data local to the corresponding voice data fragment. Again, as described above, the metadata may include information regarding adjacent voice data fragments. The information may be embodied as one or more words, syllables, or phrases of the adjacent voice data fragments. After the compute device 102 has determined the metadata for each voice data fragment, the compute device 102 appends the metadata to the corresponding voice data fragment in block 336. To do so, the compute device 102 may utilize any suitable methodology to append the metadata such as a data list or the like.

In block 338, the compute device 102 scrambles the voice data fragments. To do so, in block 340, the compute device 102 may reorder the voice data fragments. As discussed above, depending on the voice processing rules stored in the voice processing rule database 210, the compute device 102 may fragment the captured voice data of user into words, syllables, phrases, or other fragment. In those embodiments in which the compute device 102 fragmented the captured voice data into words, the compute device 102 may reorder those fragmented words of the voice data fragments to generate the scrambled voice data fragments in block 342. Alternatively, in those embodiments in which the compute device 102 fragmented the captured voice data into syllables, the compute device 102 may reorder those fragmented syllables of the voice data fragments to generate the scrambled voice data fragments in block 344. Further, in those embodiments in which the compute device 102 fragmented the captured voice data into phrases, the compute device 102 may reorder those fragmented phrases of the voice data fragments to generate the scrambled voice data fragments in block 346. In some embodiments, in block 348, the compute device 102 may randomly reorder the voice data fragments to generate the scrambled voice data fragments. Alternatively, in other embodiments in block 350, the compute device 102 may reorder the voice data fragments based on the one or more scrambled parameters stored in the voice processing rules 210. For example, the scrambled parameter may indicate an algorithm used to reorder the voice data fragments to generate the scrambled voice data fragments or a minimum number of words, syllables, or phrases that each fragment should be moved from its corresponding original position within the unscrambled set of voice data fragments.

After the compute device 102 has processed the raw, captured voice data of the user into the processed voice data (i.e., into the scrambled voice data fragments), the compute device 102 transfers or transmits the scrambled voice data fragments to the server 104 over the network 106 in block 352. It should be appreciated that by fragmenting and scrambling the captured voice data of the user, privacy-sensitive information associated with the captured voice data is reduced or removed to thereby lower the risk of compromising the user's privacy-sensitive information when the user's processed voice data is transferred outside of the compute device 102.

Figure 5:
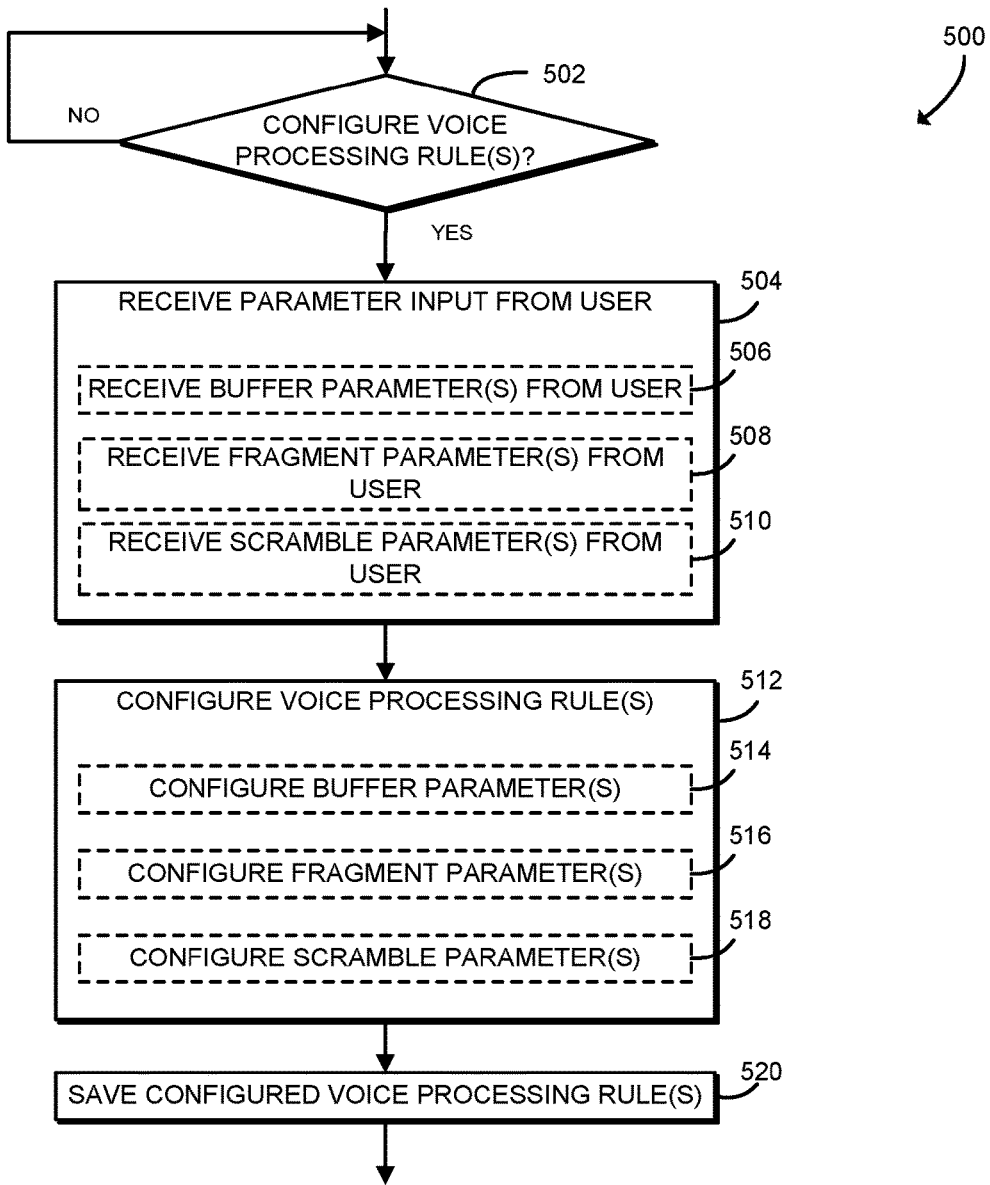
FIG. 5 is a simplified flow diagram of at least one embodiment of a method for configuring one or more voice processing rules that may be executed by the compute device of FIGS. 1 and 2.

Referring now to FIG. 5, in use, the compute device 102 may execute a method 500 for configuring the voice processing rules stored in the voice processing rule database 210. The method 500 begins with block 502 in which the compute device 102 determines whether to configure one or more of the voice processing rules (e.g., based on an indication received from a user). If so, the method 500 advances to block 504 in which the compute device 102 receives one or more parameter inputs from the user. As discussed above, the voice processing rules may include the buffer parameter(s), the fragment parameter(s), the scramble parameter(s), and/or other parameters used in processing the captured voice data to reduce or remove privacy-sensitive information. For example, in block 506, the compute device 102 may receive the buffer parameter(s) from the user. Additionally or alternatively, in block 508, the compute device 102 may receive the fragment parameter(s) from the user. Additionally or alternatively, in block 510, the compute device 102 may receive the scramble parameter(s) from the user. Such user-defined parameters may be selected by the user from a graphical user interface or otherwise provided to the compute device 102 by the user via a suitable mechanism (e.g., via the user interface manager 214). It should be appreciated that the user may select an appropriate hardware or software button or widget to configure one or more voice processing rules stored in the voice processing rule database 210.

After the compute device 102 has received the parameter input(s) from the user, the method 500 advances to block 512. In block 512, the compute device 102 configures the voice processing rules based on the user input. For example, in block 514, the compute device 102 configures the buffer parameter(s) based on the received buffer parameter(s) from the user. Additionally or alternatively, in block 516, the compute device 102 configures the fragment parameter(s) based on the received fragment parameter(s) from the user. Additionally or alternatively, in block 518, the compute device 102 configures the scramble parameter(s) based on the received scramble parameter(s) from the user. In block 520, the compute device 102 saves the configured voice processing rules in the voice processing rule database 210.

Figure 6:
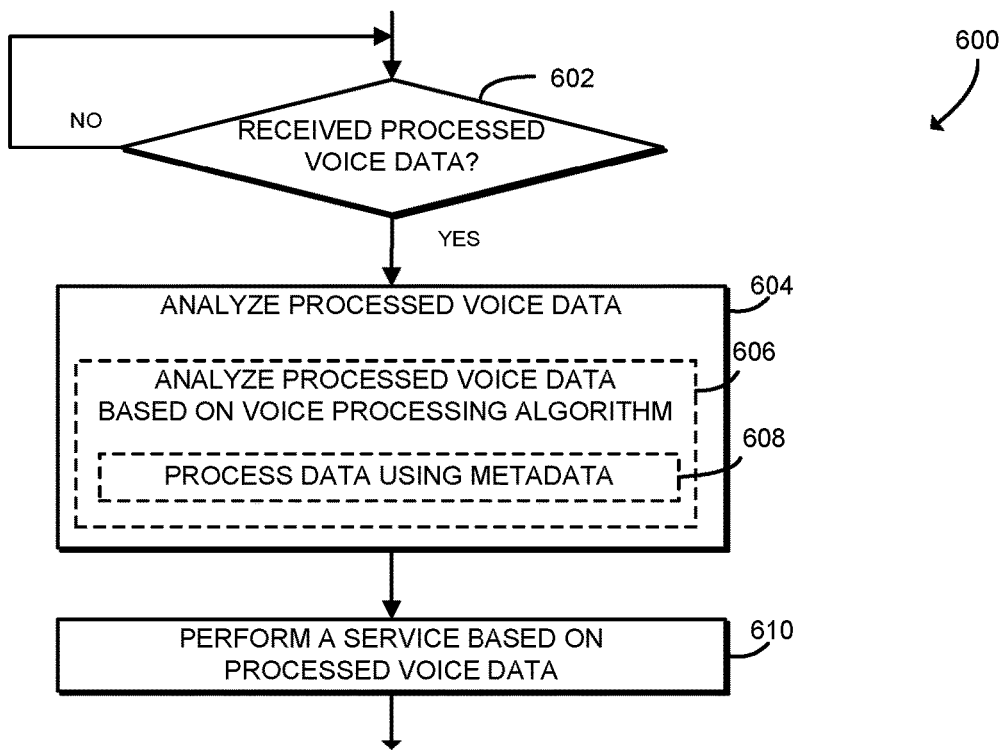
FIG. 6 is a simplified flow diagram of at least one embodiment of a method for processing scrambled voice data fragments that may be executed by a server of FIG. 1.

Referring now to FIG. 6, in use, the server 104 may execute a method 600 for analyzing the processed voice data of the user (i.e., the scrambled voice data fragments). The method 600 begins with block 602 in which the server 104 determines whether the processed voice data was received from the compute device 102. If so, the method 600 advances to block 604 in which the server 104 analyzes the processed voice data. For example, in some embodiments, the server 104 analyzes the processed voice data based on a voice processing algorithm in block 606. In those embodiments, in block 608, the voice processing algorithm may rely on metadata associated with each voice data fragment. After the server 104 analyzed the processed voice data of the user (i.e., the scrambled voice data fragments), in block 610, the server 104 performs a voice-related service based on the processed voice data. In this way, the sever 104 may train and provide voice-related services utilizing the scrambled voice data fragments while maintaining an amount of privacy of the user, even though the user's voice may have been continually captured over a long period of time.

EXAMPLES

Illustrative examples of the technologies disclosed herein are provided below. An embodiment of the technologies may include any one or more, and any combination of, the examples described below.

Example 1 includes a compute device for privately processing voice data, the compute device comprising an audio capturer to capture voice data of a user of the compute device; and a voice processor to (i) fragment the voice data to generate a plurality of voice data fragments, and (ii) scramble the plurality of voice data fragments to generate scrambled voice data fragments having a sequential order different from the plurality of voice data fragments.

Example 2 includes the subject matter of Example 1, and further including a microphone, wherein to capture the voice data comprises to capture, via the microphone, the voice data of the user.

Example 3 includes the subject matter of any of Examples 1 and 2, and wherein to capture the voice data comprises to capture the voice data of the user along with background noise.

Example 4 includes the subject matter of any of Examples 1-3, and further including a filter, wherein the filter is configured to remove the background noise from the voice data.

Example 5 includes the subject matter of any of Examples 1-4, and wherein to capture the voice data comprises to save the voice data in a buffer; and to fragment the voice data comprises to fragment the voice data in response to a size of the buffer satisfying a reference buffer size.

Example 6 includes the subject matter of any of Examples 1-5, and wherein to fragment the voice data comprises to fragment the voice data based on a fragment parameter indicative of a size of each fragment.

Example 7 includes the subject matter of any of Examples 1-6, and wherein to fragment the voice data comprises to fragment the voice data into individual words to generate the plurality of voice data fragments, wherein each voice data fragment comprises a corresponding individual word.

Example 8 includes the subject matter of any of Examples 1-7, and wherein to fragment the voice data into individual words comprises to identify word markers included in the voice data.

Example 9 includes the subject matter of any of Examples 1-8, and wherein to fragment the voice data comprises to fragment the voice data into individual syllables to generate the plurality of voice data fragments, wherein each voice data fragment comprises a corresponding individual syllable.

Example 10 includes the subject matter of any of Examples 1-9, and wherein to fragment the voice data into individual syllables comprises to identify syllable markers included in the voice data.

Example 11 includes the subject matter of any of Examples 1-10, and wherein to fragment the voice data comprises to fragment the voice data into individual phrases to generate the plurality of voice data fragments, wherein each voice data fragment comprises a corresponding individual phrase.

Example 12 includes the subject matter of any of Examples 1-11, and wherein to fragment the voice data into individual phrases comprises to identify phrase markers included in the voice data.

Example 13 includes the subject matter of any of Examples 1-12, and wherein the voice processor further comprises to (i) determine metadata for each voice data fragment, and (ii) append the metadata to the corresponding voice data fragment.

Example 14 includes the subject matter of any of Examples 1-13, and wherein to determine the metadata comprises to determine context associated with the corresponding voice data fragment.

Example 15 includes the subject matter of any of Examples 1-14, and wherein to determine the metadata comprises to determine voice data local to the corresponding voice data fragment.

Example 16 includes the subject matter of any of Examples 1-15, and wherein to scramble the voice data fragments comprises to reorder the plurality of voice data fragments.

Example 17 includes the subject matter of any of Examples 1-16, and wherein to reorder the plurality of voice data fragments comprises to randomly reorder the plurality of voice data fragments.

Example 18 includes the subject matter of any of Examples 1-17, and to reorder the plurality of voice data fragments comprises to reorder the plurality of voice data fragments based on a reference scramble parameter indicative of an algorithm used to reorder the plurality of voice data fragments.

Example 19 includes the subject matter of any of Examples 1-18, and further including a database including a plurality of voice processing rules to generate the scrambled voice data fragments.

Example 20 includes the subject matter of any of Examples 1-19, and further including a voice processing manager configured to configure the voice processing rules.

Example 21 includes a method for privately processing voice data, the method comprising capturing, by a compute device, voice data of a user of the compute device continually without direction from a user of the compute device; fragmenting, by the compute device, the voice data to generate a plurality of voice data fragments; and scrambling, by the compute device, the plurality of voice data fragments to generate scrambled voice data fragments having a sequential order different from the plurality of voice data fragments.

Example 22 includes the subject matter of Example 21, and wherein capturing the voice data comprises capturing, via a microphone of the compute device, the voice data of the user.

Example 23 includes the subject matter of any of Examples 21 and 22, and wherein capturing the voice data comprises capturing the voice data of the user along with background noise.

Example 24 includes the subject matter of any of Examples 21-23, and further including filtering the voice data to remove the background noise.

Example 25 includes the subject matter of any of Examples 21-24, and wherein capturing the voice data comprises saving the voice data in a buffer; and fragmenting the voice data comprises fragmenting the voice data in response to a size of the buffer satisfying a reference buffer size.

Example 26 includes the subject matter of any of Examples 21-25, and wherein fragmenting the voice data comprises fragmenting the voice data based on a fragment parameter indicative of a size of each fragment.

Example 27 includes the subject matter of any of Examples 21-26, and wherein fragmenting the voice data comprises fragmenting the voice data into individual words to generate the plurality of voice data fragments, wherein each voice data fragment comprises a corresponding individual word.

Example 28 includes the subject matter of any of Examples 21-27, and, wherein fragmenting the voice data into individual words comprises identifying word markers included in the voice data.

Example 29 includes the subject matter of any of Examples 21-28, and wherein fragmenting the voice data comprises fragmenting the voice data into individual syllables to generate the plurality of voice data fragments, wherein each voice data fragment comprises a corresponding individual syllable.

Example 30 includes the subject matter of any of Examples 21-29, and wherein fragmenting the voice data into individual syllables comprises identifying syllable markers included in the voice data.

Example 31 includes the subject matter of any of Examples 21-30, and wherein fragmenting the voice data comprises fragmenting the voice data into individual phrases to generate the plurality of voice data fragments, wherein each voice data fragment comprises a corresponding individual phrase.

Example 32 includes the subject matter of any of Examples 21-31, and wherein fragmenting the voice data into individual phrases comprises identifying phrase markers included in the voice data.

Example 33 includes the subject matter of any of Examples 21-32, and further including (i) determining metadata for each voice data fragment and (ii) appending the metadata to the corresponding voice data fragment.

Example 34 includes the subject matter of any of Examples 21-33, and wherein determining the metadata comprises determining context associated with the corresponding voice data fragment.

Example 35 includes the subject matter of any of Examples 21-34, and wherein determining the metadata comprises determining voice data local to the corresponding voice data fragment.

Example 36 includes the subject matter of any of Examples 21-35, and wherein scrambling the voice data fragments comprises reordering the plurality of voice data fragments.

Example 37 includes the subject matter of any of Examples 21-36, and wherein reordering the plurality of voice data fragments comprises randomly reordering the plurality of voice data fragments.

Example 38 includes the subject matter of any of Examples 21-37, and wherein reordering the plurality of voice data fragments comprises reordering the plurality of voice data fragments based on a reference scramble parameter indicative of an algorithm used to reorder the plurality of voice data fragments.

Example 39 includes the subject matter of any of Examples 21-38, and further including configuring a voice processing rules, wherein (i) fragmenting the voice data comprises fragmenting the voice data based on the voice processing rules, and (ii) scrambling the plurality of voice data fragments comprises scrambling the plurality of voice data fragments based on the voice processing rules.

Example 40 includes the subject matter of any of Examples 21-39, and further including transferring the scrambled voice data fragments to a server.

Example 41 includes one or more machine-readable storage media comprising a plurality of instructions stored thereon that, when executed, causes a compute device to perform the method of any of Examples 20-39.

Example 42 includes a compute device for privately processing voice data, the compute device comprising means for capturing voice data of a user of the compute device continually without direction from a user of the compute device; means for fragmenting the voice data to generate a plurality of voice data fragments; and means for scrambling the plurality of voice data fragments to generate scrambled voice data fragments having a sequential order different from the plurality of voice data fragments.

Example 43 includes the subject matter of Example 42, and wherein the means for capturing the voice data comprises means for capturing, via a microphone of the compute device, the voice data of the user.

Example 44 includes the subject matter of any of Examples 42 and 43, and wherein the means for capturing the voice data comprises means for capturing the voice data of the user along with background noise.

Example 45 includes the subject matter of any of Examples 42-44, and further including means for filtering the voice data to remove the background noise.

Example 46 includes the subject matter of any of Examples 42-45, and, wherein the means for capturing the voice data comprises means for saving the voice data in a buffer; and the means for fragmenting the voice data comprises means for fragmenting the voice data in response to a size of the buffer satisfying a reference buffer size.

Example 47 includes the subject matter of any of Examples 42-46, and wherein the means for fragmenting the voice data comprises means for fragmenting the voice data based on a fragment parameter indicative of a size of each fragment.

Example 48 includes the subject matter of any of Examples 42-47, and wherein the means for fragmenting the voice data comprises means for fragmenting the voice data into individual words to generate the plurality of voice data fragments, wherein each voice data fragment comprises a corresponding individual word.

Example 49 includes the subject matter of any of Examples 42-48, and wherein the means for fragmenting the voice data into individual words comprises means for identifying word markers included in the voice data.

Example 50 includes the subject matter of any of Examples 42-49, and wherein the means for fragmenting the voice data comprises means for fragmenting the voice data into individual syllables to generate the plurality of voice data fragments, wherein each voice data fragment comprises a corresponding individual syllable.

Example 51 includes the subject matter of any of Examples 42-50, and wherein the means for fragmenting the voice data into individual syllables comprises means for identifying syllable markers included in the voice data.

Example 52 includes the subject matter of any of Examples 42-51, and wherein the means for fragmenting the voice data comprises means for fragmenting the voice data into individual phrases to generate the plurality of voice data fragments, wherein each voice data fragment comprises a corresponding individual phrase.

Example 53 includes the subject matter of any of Examples 42-52, and wherein the means for fragmenting the voice data into individual phrases comprises means for identifying phrase markers included in the voice data.

Example 54 includes the subject matter of any of Examples 42-53, and further including (i) means for determining metadata for each voice data fragment and (ii) means for appending the metadata to the corresponding voice data fragment.

Example 55 includes the subject matter of any of Examples 42-54, and wherein the means for determining the metadata comprises means for determining context associated with the corresponding voice data fragment.

Example 56 includes the subject matter of any of Examples 42-55, and, wherein the means for determining the metadata comprises means for determining voice data local to the corresponding voice data fragment.

Example 57 includes the subject matter of any of Examples 42-56, and wherein the means for scrambling the voice data fragments comprises means for reordering the plurality of voice data fragments.

Example 58 includes the subject matter of any of Examples 42-57, and wherein the means for reordering the plurality of voice data fragments comprises means for randomly reordering the plurality of voice data fragments.

Example 59 includes the subject matter of any of Examples 42-58, and wherein the means for reordering the plurality of voice data fragments comprises means for reordering the plurality of voice data fragments based on a reference scramble parameter indicative of an algorithm used to reorder the plurality of voice data fragments.

Example 60 includes the subject matter of any of Examples 42-59, and further including means for configuring a voice processing rules, wherein (i) the means for fragmenting the voice data comprises means for fragmenting the voice data based on the voice processing rules, and (ii) the means for scrambling the plurality of voice data fragments comprises means for scrambling the plurality of voice data fragments based on the voice processing rules.

Example 61 includes the subject matter of any of Examples 42-60, and further including means for transferring the scrambled voice data fragments to a server.

The invention claimed is:

1. A compute device for privately processing voice data, the compute device comprising:
    an audio capturer to capture voice data of a user of the compute device and store the captured voice data in a buffer, wherein the captured voice data is not fragmented; and
    a voice processor to (i) fragment the captured voice data previously stored in the buffer, in response to a determination that an amount of the captured voice data stored in the buffer satisfies a reference buffer fill size, to generate a plurality of voice data fragments, and (ii) scramble the plurality of voice data fragments to generate scrambled voice data fragments having a sequential order different from the plurality of voice data fragments, wherein to scramble the plurality of voice data fragments comprises to reorder the voice data fragments such that each fragment is repositioned from its corresponding original sequential position in the voice data by a particular number of words, syllables, or phrases.

2. The compute device of claim 1, wherein to scramble the voice data fragments comprises to reorder the plurality of voice data fragments.

3. The compute device of claim 2, wherein to reorder the plurality of voice data fragments comprises to randomly reorder the plurality of voice data fragments.

4. The compute device of claim 2, to reorder the plurality of voice data fragments comprises to reorder the plurality of voice data fragments based on a reference scramble parameter indicative of an algorithm used to reorder the plurality of voice data fragments.

5. The compute device of claim 1, wherein to fragment the captured voice data previously stored in the buffer comprises to fragment the captured voice data based on a fragment parameter indicative of a size of each fragment.

6. The compute device of claim 1, wherein to fragment the captured voice data previously stored in the buffer comprises to fragment the captured voice data into individual words to generate the plurality of voice data fragments, wherein each voice data fragment comprises a corresponding individual word.

7. The compute device of claim 1, wherein to fragment the captured voice data previously stored in the buffer comprises to fragment the captured voice data into individual syllables to generate the plurality of voice data fragments, wherein each voice data fragment comprises a corresponding individual syllable.

8. The compute device of claim 1, wherein to fragment the captured voice data previously stored in the buffer comprises to fragment the captured voice data into individual phrases to generate the plurality of voice data fragments, wherein each voice data fragment comprises a corresponding individual phrase.

9. One or more non-transitory, machine-readable storage media comprising a plurality of instructions stored thereon that, when executed, causes a compute device to:
    capture voice data of a user of the compute device continually without direction from a user of the compute device;
    store the captured voice data in a buffer, wherein the captured voice data is not fragmented;
    fragment the captured voice data previously stored in the buffer, in response to a determination that an amount of the captured voice data stored in the buffer satisfies a reference buffer fill size, to generate a plurality of voice data fragments; and
    scramble the plurality of voice data fragments to generate scrambled voice data fragments having a sequential order different from the plurality of voice data fragments, wherein to scramble the plurality of voice data fragments comprises to reorder the voice data fragments such that each fragment is repositioned from its corresponding original sequential position in the voice data by a particular number of words, syllables, or phrases.

10. The one or more non-transitory, machine-readable storage media of claim 9, wherein to scramble the voice data fragments comprises to reorder the plurality of voice data fragments.

11. The one or more non-transitory, machine-readable storage media of claim 10, wherein to reorder the plurality of voice data fragments comprises to randomly reorder the plurality of voice data fragments.

12. The one or more non-transitory, machine-readable storage media of claim 9, wherein to fragment the captured voice data previously stored in the buffer comprises to fragment the captured voice data based on a fragment parameter indicative of a size of each fragment.

13. The one or more non-transitory, machine-readable storage media of claim 9, wherein to fragment the captured voice data previously stored in the buffer comprises to fragment the captured voice data into individual words to generate the plurality of voice data fragments, wherein each voice data fragment comprises a corresponding individual word.

14. The one or more non-transitory, machine-readable storage media of claim 9, wherein to fragment the captured voice data previously stored in the buffer comprises to fragment the captured voice data into individual syllables to generate the plurality of voice data fragments, wherein each voice data fragment comprises a corresponding individual syllable.

15. The one or more non-transitory, machine-readable storage media of claim 9, wherein to fragment the captured voice data previously stored in the buffer comprises to fragment the captured voice data into individual phrases to generate the plurality of voice data fragments, wherein each voice data fragment comprises a corresponding individual phrase.

16. A method for privately processing voice data, the method comprising:
    capturing, by a compute device, voice data of a user of the compute device continually without direction from a user of the compute device;
    storing the captured voice data in a buffer, wherein the captured voice data is not fragmented;
    fragmenting, by the compute device, the captured voice data previously stored in the buffer, in response to a determination that an amount of the captured voice data stored in the buffer satisfies reference buffer fill size, to generate a plurality of voice data fragments; and
    scrambling, by the compute device, the plurality of voice data fragments to generate scrambled voice data fragments having a sequential order different from the plurality of voice data fragments, wherein scrambling the plurality of voice data fragments comprises reordering the voice data fragments such that each fragment is repositioned from its corresponding original sequential position in the voice data by a particular number of words, syllables, or phrases.

17. The method of claim 16, wherein scrambling the voice data fragments comprises reordering the plurality of voice data fragments.

18. The method of claim 17, wherein reordering the plurality of voice data fragments comprises randomly reordering the plurality of voice data fragments.

19. The method of claim 16, wherein fragmenting the captured voice data previously stored in the buffer comprises fragmenting the captured voice data based on a fragment parameter indicative of a size of each fragment.

20. The method of claim 16, wherein fragmenting the captured voice data previously stored in the buffer comprises fragmenting the captured voice data into individual words to generate the plurality of voice data fragments, wherein each voice data fragment comprises a corresponding individual word.

21. The method of claim 16, wherein fragmenting the captured voice data previously stored in the buffer comprises fragmenting the captured voice data into individual syllables to generate the plurality of voice data fragments, wherein each voice data fragment comprises a corresponding individual syllable.

22. The method of claim 16, wherein fragmenting the captured voice data previously stored in the buffer comprises fragmenting the captured voice data into individual phrases to generate the plurality of voice data fragments, wherein each voice data fragment comprises a corresponding individual phrase.

* * * * *